Jan. 16, 1934.    C. L. WEST ET AL    1,943,466
SHARP FREEZING STRUCTURE
Filed Nov. 20, 1929
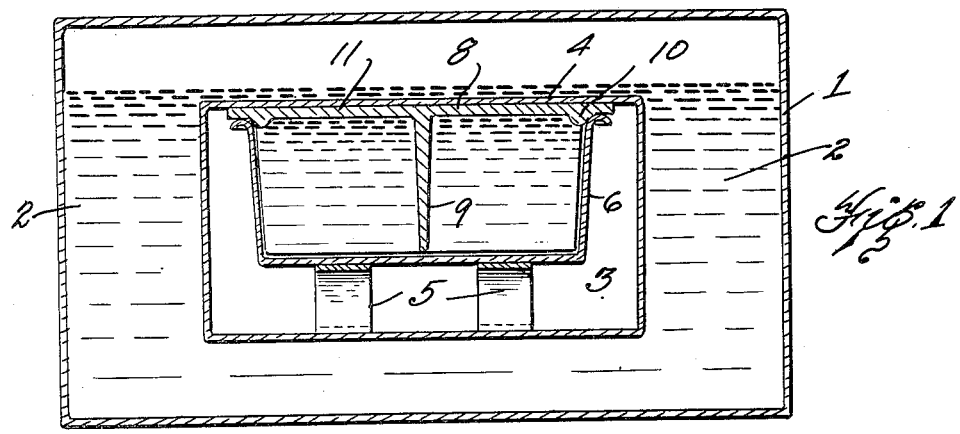
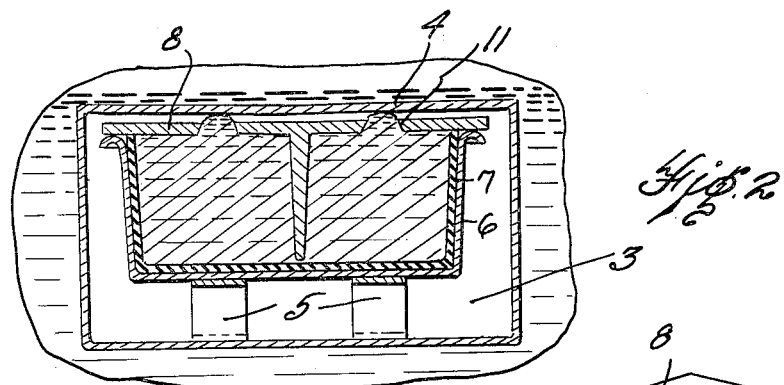
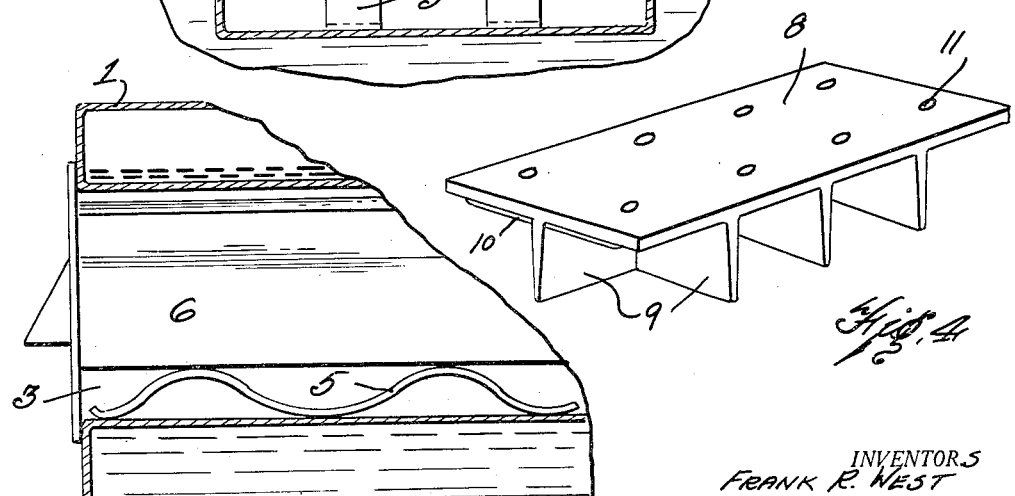
INVENTORS
FRANK R. WEST
CONSTANCE L. WEST
BY Stuart C. Barnes
ATTORNEY.

Patented Jan. 16, 1934

1,943,466

UNITED STATES PATENT OFFICE 1,943,466

SHARP FREEZING STRUCTURE

Constance Lane West and Frank R. West, Highland Park, Mich.

Application November 20, 1929
Serial No. 408,588

9 Claims. (Cl. 62—108.5)

This invention relates to sharp freezing units, and has to do particularly with a novel and simple sharp freezing container and manner of supporting the same whereby to greatly accelerate the sharp freezing action of the unit.

The freezing of ice cubes and the sharp freezing of any substances whether in the sharp freezing unit of a domestic refrigerator or in connection with any other automatic refrigerating units has always presented many problems. Rapid sharp freezing has always been desirable but such rapid freezing, of necessity, had to be proportioned relative to the efficiency of the unit and the temperature to be maintained in the remaining part of the refrigerator. The sharp freezing of ice cubes, for instance, has always been a question of hours and even with the design of means for increasing the refrigerating effect the actual freezing has still consumed a relatively long time.

It is the object of the present invention to provide an extremely simple and inexpensive sharp freezing container which may be used in connection with any standard sharp freezing unit, and inserted in the sharp freezing chamber of such unit in the same manner as the ordinary ice cube tray, the design of the container and the manner of positioning the same when inserted being such as to effect a much better and more rapid conduction of heat units through the container without varying the normal supply of heat units, or in other words, without varying the normal ice melting capacity of the cooling unit or evaporator. This novel result is obtained by simply providing a grid unit formed of a material of good conductivity and positioning the same in heat conducting relation with a wall of the sharp freezing unit.

In the drawing:

Fig. 1 is a vertical sectional view, somewhat diagrammatic, through a sharp freezing unit embodying the present invention, and illustrating the preferred manner of forming the grid unit and positioning the same in contact with the top wall of the sharp freezing chamber.

Fig. 2 is a view similar to Fig. 1 but showing the contents of the tray as being frozen and expanded with the result that the entire unit has been forced away from the top wall of the chamber.

Fig. 3 is a longitudinal sectional view through the structure shown in Fig. 1.

Fig. 4 is a perspective view of one form of simple grid unit for embodying the present invention.

In carrying out the present invention, any form or type of sharp freezing unit may be utilized and in Fig. 1 we have shown a conventional cooling unit 1 provided with a supply of refrigerating medium 2 and an inner chamber 3 which may be called a sharp freezing chamber. Although, as stated above, the present invention may be equally well adapted to all types of cooling units we prefer to use the same in connection with an evaporator of the flooded type in which case the level of the refrigerant 2 is preferably near the top 4 of the sharp freezing chamber.

The sharp freezing chamber 3 may, of course, consist of any number of chambers arranged as desired, but in each case we preferably provide means for positioning and holding the sharp freezing container so that it contacts with the upper wall 4 of the sharp freezing chamber. Such positioning and holding means are preferably resilient and in the illustrated embodiment we have shown suitable spring members 5.

The sharp freezing container 6 may be of any standard form, either metal or rubber or other material; or the container may consist of an outer metallic shell and an inner container of rubber. In Fig. 2 we have shown an inner container 7 of rubber or similar material.

Regardless of the form of the main container the grid unit instead of being just an open grid is preferably formed with a metallic top 8 and depending ribs 9 although it will be obvious that good results may be obtained by merely using an open grid work and so positioning the container that the side walls of the main container and the top edges of the grid contact with the top wall 4 of the sharp freezing chamber.

To obtain a maximum transfer of heat units, however, the grids should be provided with a suitable top element for contact with the upper wall of the sharp freezing chamber. For instance, if the main container 6 is formed of metal, and the grid unit, such as shown in Fig. 4, inserted therein and then the entire unit inserted in the sharp freezing chamber as shown in Fig. 1, it will be obvious that the sharp freezing container will be resiliently held against the top of the sharp freezing chamber. In the position of the container, as shown in Fig. 1, it will be seen that we have provided a direct conduction for the heat units so that every pocket of liquid is surrounded by a heat conducting surface on five sides; that is, on the top and the four side walls, two or three of the side walls being made up of the partitions of the grid and the remaining wall or walls being formed by the main container 6.

Inasmuch as the top edge of the main container 6 is preferably in contact with the plate 8 or the top wall 4 of the evaporator, it will be obvious that the heat units will also be directly conducted to the bottom of the main container 6 whereby in reality each pocket of liquid will be really surrounded on six sides by walls of heat conducting material which in turn are in direct contact with the surface of the sharp freezing chamber. Thus, while only one surface of our novel sharp freezing container contacts with one wall of the sharp freezing chamber, it will be seen that we conduct the heat units therefrom to all the partitions of the grid and thus to the central part of the body of liquid as well as to the top sides and bottom.

In the normal operation of our container, it is preferably filled to the top with liquid and for this purpose we preferably provide a downwardly extending ridge 10 which is designed to snugly fit against the upper edge of the main container 6. Due to the rapid transfer of heat units, the liquid will soon start to freeze. This freezing action will also be accomplished by an expansion of the liquid and in view of this action we have provided suitable apertures 11 for the top plate whereby the expanding ice or other frozen liquid will protrude through such apertures, contact with the top wall 4 and force the entire unit away from the top wall. This projection of the frozen points through the apertures will be accompanied by a popping noise indicating when the liquid has become frozen. By the forcing of the top 8 away from the upper wall of the sharp freezing chamber, it will also make it much easier to withdraw the sharp freezing container from the chamber.

If desired, it will be obvious that the top wall 8 may be formed slightly concave so that its bottom surface will be slightly below the level of the liquid. With such a concave surface of the plate 8, it will be obvious that the upper wall 4 should be also slightly concave, as indicated in Fig. 2. In this case, of course, it would not be necessary to maintain the level of the water up to the top of the main container.

It will also be obvious that the present invention is particularly adapted to the freezing of ice cubes in rubber containers. I have shown in Fig. 2, that such rubber containers may be supported by a main metal container 6 and in this case the heat will not only be abstracted directly from the interior of the container and thus quickly freeze the contents thereof irrespective of the material of the main container, but with the main supporting container 6 it will be obvious that we have provided a direct heat conductivity entirely around the rubber container 7. In case a main rubber container is used, it will be obvious that the grid and the frozen cubes of ice may be readily removed therefrom. It will also be obvious that even the surfaces of the grids or partitions 9 and a portion of the top member 8 would be coated with a substance to which ice does not readily adhere, and while the time of freezing might be retarded somewhat, the actual freezing time would be much faster than is now standard practice.

What I claim is:

1. The method of accelerating the freezing of liquids in sharp freezing containers of the type having a sharp freezing chamber for receiving the container, which comprises positioning the container into contacting relation with the upper wall of the chamber, resiliently holding the container against said top wall and allowing a portion of the expanding frozen liquid to contact with said top wall whereby the container is forced away as a unit from said top wall due to said expanding action.

2. Sharp freezing structure, comprising a cooling unit provided with a closed sharp freezing chamber in permanently fixed position, a sharp freezing container for receiving the substance to be frozen, and means for positioning the container in direct contact with the upper wall of the chamber.

3. Sharp freezing structure, comprising a sharp freezing chamber, a sharp freezing container adapted to be positioned within the chamber, and including a grid unit for dividing the container into a plurality of compartments and means for positively forcing the container into contact with the top of the chamber whereby said grid unit is maintained in direct heat conducting relation with the top of said chamber.

4. Sharp freezing structure, comprising a sharp freezing chamber, a sharp freezing container consisting of a bottom and side walls, grid structure consisting of partitions and a top plate, and means having relatively small contact with the container for normally holding the same adjacent the top of the chamber whereby to cause direct contact between the top of the grid structure and the top of the chamber.

5. Sharp freezing structure, comprising a sharp freezing chamber, a sharp freezing container consisting of a bottom and side walls, grid structure consisting of partitions and a top plate, and means having relatively small contact with the container for normally holding the same adjacent the top of the chamber whereby to cause direct contact between the top of the grid structure and the top of the chamber, and apertures in said top plate for permitting the frozen liquid to expand therethrough.

6. Sharp freezing construction, comprising a cooling unit provided with a sharp freezing chamber, a sharp freezing container positioned within the chamber and grid means separate from the container formed of relatively high heat conducting material extending within the substance in said container said means having direct contact with a surface of said sharp freezing chamber whereby to effect heat transfer by conduction.

7. Sharp freezing structure, comprising a cooling unit provided with a sharp freezing surface, a sharp freezing container adapted to be moved into a position whereby the top thereof is adjacent to said surface, and means formed of relatively high heat conducting material extending within the substance in said container, said means having direct heat conducting relation with said sharp freezing surface.

8. Sharp freezing structure comprising a cooling unit provided with a closed sharp freezing chamber, a sharp freezing container for receiving the substance to be frozen and for disposition within the closed chamber, and means for resiliently positioning the container in direct contact with the upper wall of the chamber.

9. Sharp freezing structure, comprising a sharp freezing chamber, a sharp freezing container consisting of bottom and side walls, a sharp freezing surface within said chamber and positioned above the container when the container is positioned within the sharp freezing chamber, separate grid means formed of relatively high heat conducting material and extending within the substance in said container, and means for normally holding said grid means in direct heat conducting relation with said sharp freezing surface.

CONSTANCE LANE WEST.
FRANK R. WEST.